United States Patent
Ekberg (10) Patent No.: US 9,307,411 B2
(45) Date of Patent: Apr. 5, 2016

(54) PARTIALLY VIRTUALIZING PCR BANKS IN MOBILE TPM

(71) Applicant: Nokia Corporation, Espoo (FI)

(72) Inventor: Jan-Erik Ekberg, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 82 days.

(21) Appl. No.: 14/074,135

(22) Filed: Nov. 7, 2013

(65) Prior Publication Data

US 2014/0130124 A1     May 8, 2014

Related U.S. Application Data (60) Provisional application No. 61/723,976, filed on Nov. 8, 2012.

(51) Int. Cl.

| | |
|---|---|
| *G06F 21/00* | (2013.01) |
| *H04W 12/10* | (2009.01) |
| *H04L 9/08* | (2006.01) |
| *G09C 1/00* | (2006.01) |
| *G06F 21/57* | (2013.01) |
| *H04W 4/00* | (2009.01) |

(52) U.S. Cl.
CPC .............. *H04W 12/10* (2013.01); *G06F 21/57* (2013.01); *G09C 1/00* (2013.01); *H04L 9/0877* (2013.01); *H04W 4/003* (2013.01)

(58) Field of Classification Search
CPC ...... G06F 21/57; H04W 12/10; H04W 4/003; H04L 9/0877; H04L 2209/127; H04L 9/0897; G09C 1/10
See application file for complete search history.

(56) References Cited

U.S. PATENT DOCUMENTS

| | | | | |
|---|---|---|---|---|
| 8,875,240 | B2 * | 10/2014 | Spiers et al. ...................... 726/3 |
| 2005/0120219 | A1 * | 6/2005 | Munetoh et al. .............. 713/176 |
| 2005/0251857 | A1 * | 11/2005 | Schunter et al. ................ 726/16 |
| 2005/0268093 | A1 * | 12/2005 | Proudler ....................... 713/164 |
| 2006/0212939 | A1 * | 9/2006 | England et al. ................ 726/22 |
| 2008/0046581 | A1 * | 2/2008 | Molina et al. ................ 709/229 |
| 2008/0046752 | A1 | 2/2008 | Berger et al. ................ 713/186 |
| 2008/0083039 | A1 | 4/2008 | Choi et al. ...................... 726/27 |
| 2008/0114989 | A1 * | 5/2008 | Anbalagan et al. ........... 713/189 |
| 2008/0126779 | A1 * | 5/2008 | Smith ............................... 713/2 |

(Continued)

FOREIGN PATENT DOCUMENTS

| | | |
|---|---|---|
| WO | WO-2007/124091 A1 | 11/2007 |
| WO | WO-2011/101795 A1 | 8/2011 |
| WO | 2013/048425 * 4/2013 .............. G06F 21/00 |

OTHER PUBLICATIONS

Cong Nie, Dynamic Root of Trust in Trusted Computing, TKK T-110.5290 Seminar on Network Security (2007).*

(Continued)

*Primary Examiner* — Taghi Arani
*Assistant Examiner* — Sharon Lynch
(74) *Attorney, Agent, or Firm* — Harrington & Smith (57) ABSTRACT

In accordance with the exemplary embodiments of the invention there is at least a method and apparatus to perform operations including triggering, with an entity of a device, an attestation with a trusted platform module/mobile platform module of the device; and in response to the triggering, sending information comprising a platform configuration register value towards the entity, where the platform configuration register depends on measurements of the entity triggering the attestation.

18 Claims, 6 Drawing Sheets

(56) References Cited

U.S. PATENT DOCUMENTS

| | | | |
|---|---|---|---|
| 2008/0235754 A1* | 9/2008 | Wiseman et al. | 726/1 |
| 2008/0244292 A1* | 10/2008 | Kumar et al. | 713/323 |
| 2008/0320308 A1 | 12/2008 | Kostiainen et al. | 713/171 |
| 2009/0007104 A1* | 1/2009 | Zimmer et al. | 718/1 |
| 2009/0086979 A1* | 4/2009 | Brutch et al. | 380/279 |
| 2009/0169012 A1* | 7/2009 | Smith et al. | 380/277 |
| 2009/0172378 A1* | 7/2009 | Kazmierczak et al. | 713/2 |
| 2009/0204964 A1* | 8/2009 | Foley et al. | 718/1 |
| 2009/0307487 A1* | 12/2009 | Movva et al. | 713/156 |
| 2011/0010543 A1* | 1/2011 | Schmidt et al. | 713/168 |
| 2011/0213953 A1* | 9/2011 | Challener et al. | 713/2 |
| 2012/0027213 A1* | 2/2012 | Scarlata | 380/283 |
| 2012/0089831 A1* | 4/2012 | Rozas | 713/155 |
| 2012/0266213 A1* | 10/2012 | Spiers et al. | 726/3 |
| 2012/0311315 A1* | 12/2012 | Ekberg et al. | 713/2 |
| 2012/0324214 A1* | 12/2012 | Asokan et al. | 713/100 |
| 2013/0198838 A1* | 8/2013 | Schmidt et al. | 726/22 |
| 2013/0276057 A1* | 10/2013 | Smith et al. | 726/1 |
| 2014/0101311 A1* | 4/2014 | Smeets | G06F 21/57 709/224 |
| 2015/0067813 A1* | 3/2015 | Cha et al. | 726/10 |

OTHER PUBLICATIONS

Carl Gebhardt & Chris Dalton, LaLa: A Late Launch Application, in Proceedings of the 2009 ACM Workshop on Scalable Trusted Computing (2009).*

Jonathan M. McCune et al., Minimal TCB Code Execution, in 2007 IEEE SYmposium on Security and Privacy (2007).*

Flicker: An Execution Infrastructure for TCB Minimization, in Proceedgins of the 3$^{rd}$ ACM SIGOPS/EuroSys European Conference on Computer Systems (2008).*

TCG PC Client Specific Implementation Specification for Conventional BIOS, Specificiation Version 1.21 Errata, Revision 1.00 (Feb. 24, 2012), available at http://www.trustedcomputinggroup.org/files/resource_files/CB0B2BFA-1A4B-B294-D0C3B9075B5AFF17/TCG_PCClientImplementation_1-21_1_00.pdf.*

Virtualized Trusted Platform Architecture Specification, Specification version 1.0, Revision 0.26 (Sep. 27, 2011), available athttp://www.trustedcomputinggroup.org/files/resource_files/CB0B2BFA-1A4B-B294-D0C3B9075B5AFF17/TCG_PCClientImplementation_1-21_1_00.pdf.*

"TCG Specification Architecture Overview—Specification—Revision 1.4", TCG, Aug. 2, 2007, 54 pgs.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description: Stage 2 (Release 11)", 3GPP TS 36.300 V11.3.0, Sep. 2012, 205 pgs.

Gallery, Eimear et al. "Conditional Access in Mobile Systems: Securing the Application," *Proceedings of the First International Conference on Distributed Frameworks for Multimedia Applications (DFMA '05)*, Feb. 6-9, 2005. IEEE 2005. pp. 190-197. (Jun. 2, 2005).

* cited by examiner

PARTIALLY VIRTUALIZING PCR BANKS IN MOBILE TPM

RELATED APPLICATIONS

This patent application claims priority under 35 U.S.C. §119(e) from Provisional Patent Application No. 61/723,976 filed Nov. 8, 2012 the disclosure of which is incorporated by reference herein in its entirety.

TECHNICAL FIELD

The exemplary and non-limiting embodiments of this invention relate generally to trusted computing, security and the use of a mobile trusted module in, for example, a wireless communication system and specifically, relate to providing platform binding for trusted applications run inside a trusted execution environment with TCG/TPM mechanisms.

BACKGROUND

This section is intended to provide a background or context to the invention. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

AIK attestation identity key
ASIC application specific integrated circuit
DRTM dynamic root of trust measurement
HW hardware
iTAP internal trusted application
MTM mobile trusted module
OS operating system
PCR platform configuration register
RIM reference integrity metric
SML stored measurement log
SW software
TA trusted application
TCB trusted computing base
TCE trusted computer environment
TCG trusted computing group
TEE trusted execution environment
TPM trusted platform module
UUID universally unique identifier In the architecture developed by the Trusted Computing Group (TCG) for Trusted Platform Modules (TPM) and Mobile Trusted Modules (MTM), "(entity) authentication" refers to demonstrating the claimed identity of a prover entity (i.e., a person or device) towards a (usually remote) verifier, such as an internal or external verifier device. This process is referred to as "attestation". The TPM can be used to ensure that each computer will report its configuration parameters in a trustworthy manner. In TPM, the secure environment is able to accommodate several secure programs that can leverage the measurement and corresponding bindings.

SUMMARY

In an exemplary aspect of the invention, there is a method comprising: triggering, with an entity of a device, an attestation with a trusted platform module/mobile platform module of the device; and in response to the triggering, sending information comprising a platform configuration register value towards the entity, where the platform configuration register depends on measurements of the entity triggering the attestation.

In another exemplary aspect of the invention, there is a non-transitory computer readable medium encoded with a computer program instructions executable by a processor to perform actions comprising: triggering, with an entity of a device, an attestation with a trusted platform module/mobile platform module of the device; and in response to the triggering, sending information comprising a platform configuration register value towards the entity, where the platform configuration register depends on measurements of the entity triggering the attestation.

In another exemplary aspect of the invention, there is an apparatus comprising: at least one processor; and at least one memory including computer program code, where the at least one memory and the computer program code are configured, with the at least one processor, to cause the apparatus to at least: trigger, with an entity of a device, an attestation with a trusted platform module/mobile platform module of the device; and in response to the triggering, send information comprising a platform configuration register value towards the entity, where the platform configuration register depends on measurements of the entity triggering the attestation.

In still another exemplary aspect of the invention, there is an apparatus comprising: means for triggering, with an entity of a device, an attestation with a trusted platform module/mobile platform module of the device; and means, in response to the triggering, for sending information comprising a platform configuration register value towards the entity, where the platform configuration register depends on measurements of the entity triggering the attestation.

In accordance with the exemplary embodiments of the invention as described in the paragraph above the means for triggering comprises a non-transitory memory including computer program code, the computer program code executed by at least one processor and the means for sending comprises an interface to a communication network.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1A:
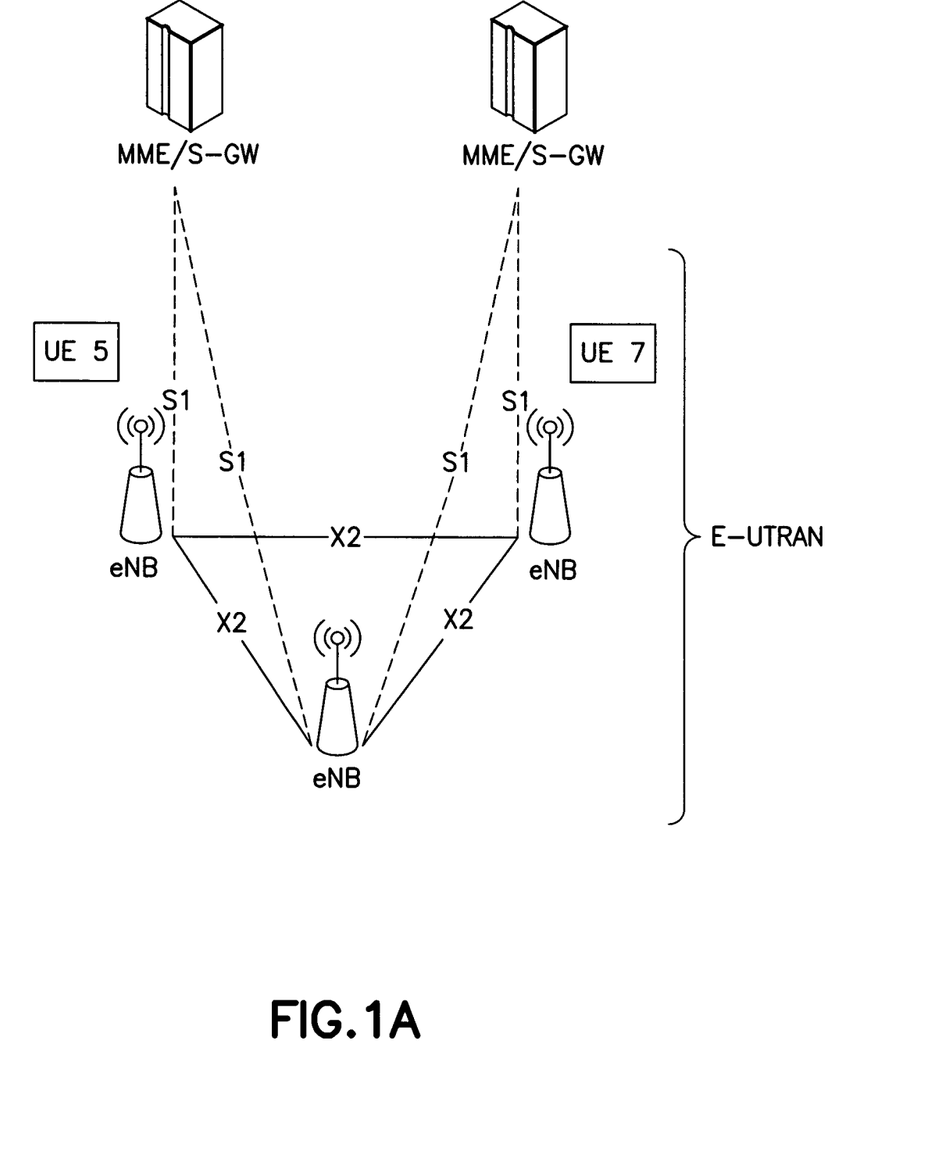
FIG. 1A is based on FIG. 4.1 of 3GPP TS 36.300, and shows the overall architecture of the E-UTRAN system which is non-limiting and wherein the exemplary embodiments of the invention may be practiced.

FIG. 1A is based on FIG. 4.1 of 3GPP TS 36.300 and shows the overall architecture of the E-UTRAN system. The E-UTRAN system includes network access nodes or eNBs providing the E-UTRAN user plane and control plane (radio resource control (RRC)) protocol terminations towards UE 5 and/or UE 7. The eNBs are interconnected with each other by means of an X2 interface. The eNBs are also connected by means of an S1 interface to an evolved packet core (EPC), and more specifically to a mobility management entity (MME) and to a serving gateway (S-GW) by means of an S1 MME interface. The S1 interface supports a many-to-many relationship between MMEs, S-GWs and eNBs. The exemplary embodiments as disclosed herein can be used in a non-limiting manner to the advantage of operators and mobile device users associated with such an E-UTRAN system.

TPMs have PCRs that are reserved for measuring code. The exemplary embodiments of the invention relate to the domain Trusted Computing. A recent addition in the mechanisms for securing the computing equipment is the late-launch technology such as dynamic root of trust mechanism (DRTM). DRTM is a way for the operating system to temporarily halt and enter a secure execution environment where either a virtual machine can be launched, a secure kernel bootstrapped, or some other code is executed. This DRTM-enabled secure environment can be used, for example, for securely executing credentials.

Presently, TPMs (v2) have a single PCR that is reserved for measuring code (for DRTM/Late Launch). The PCR is singular since in PCs only one code can be launched at a time using the late-launch mechanism. If another code is launched (into the same cache area), a new measurement is done and any binding for the old code is lost. In TPM Mobile, a similar strategy has been devised for launching programs inside the trusted execution environment. However, only one code can thereby be measured inside the trusted execution environment and bound to TPM mobile functionality. Therefore, at least the above described rigidity of PCRs makes these operations difficult.

Figure 1B:
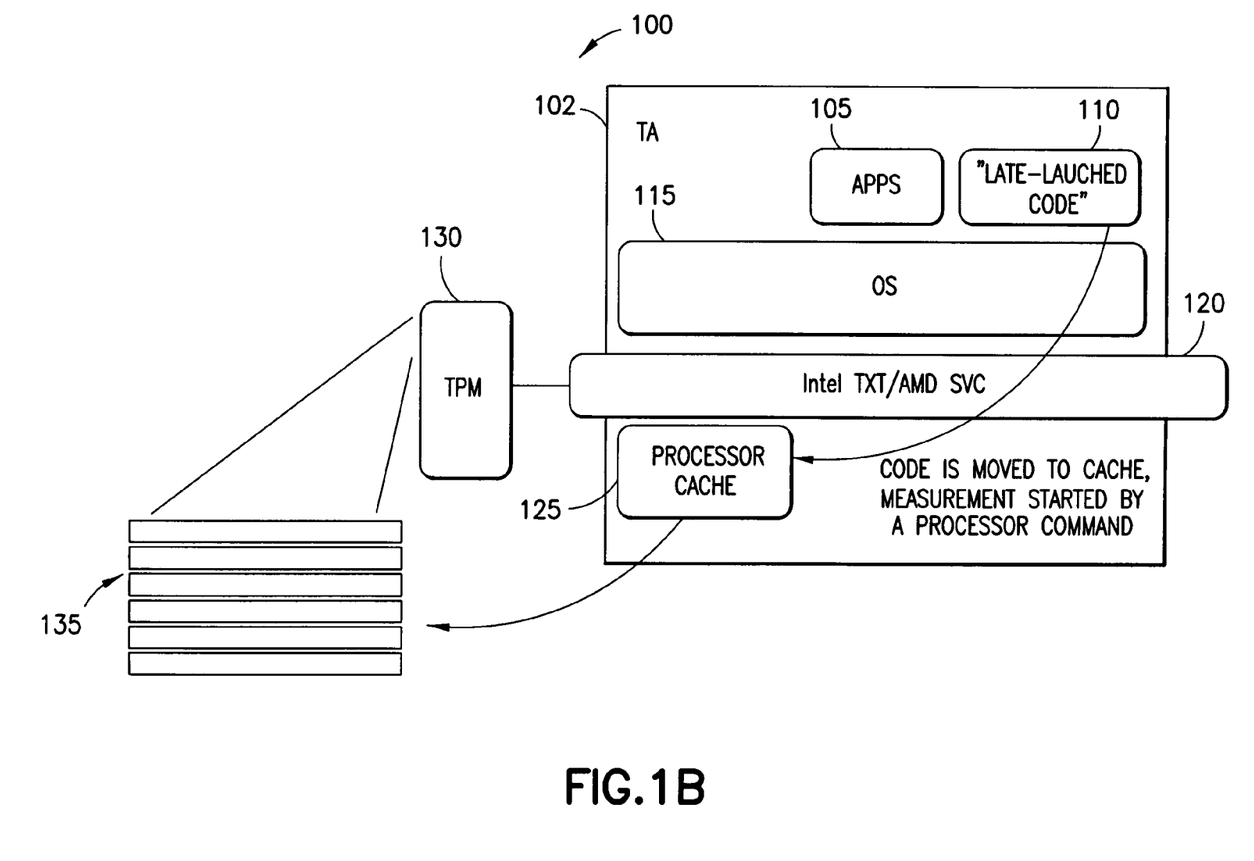
FIG. 1B illustrates a TPM PC client measured TPM program operation in accordance with the exemplary embodiments of the invention.
Figure 1C:
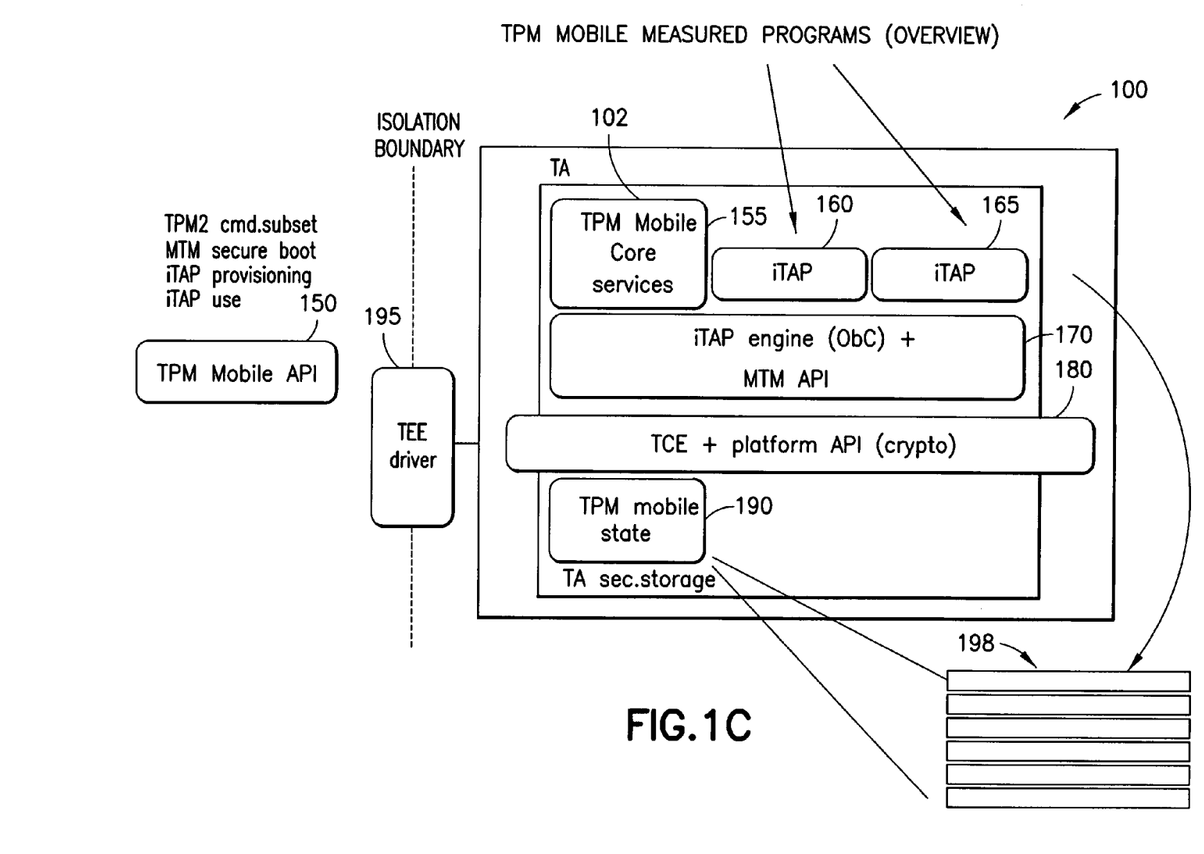
FIG. 1C illustrates a TPM Mobile measured TPM program operation in accordance with the exemplary embodiments of the invention.

FIGS. 1B and 1C illustrate operations of a TPM PC client 100 and a TPM Mobile measured program 130 or TPM Mobile API 150, respectively. The API 150 can be for at least TPM2 command subset, MTM secure boot, iTAP provisioning, and/or iTAP use. FIG. 1B illustrates a TPM PC client measured TPM program principle operation overview. As illustrated in FIG. 1B the trusted computer base TA 102 includes trusted application module (Apps) 105, late-launched code module 110, and operating system (OS) 115, TA. In FIG. 1B a trusted computer base (TCB) of the trusted application (TA 100) carries out the PCR application (e.g., late-launched application) measurements. This is accomplished by executing a processor command to move measurement code, such as for Intel® or AMD® text and/or service (SVC) applications 120, with its processor cache 125 for processing to a virtualized PCR register 135. For example code is moved to cache 125 by a processor command, and late-launched measurements as carried out by the TCB using the code and the measurements provided to the virtualized PCR register 135. FIG. 1C illustrates another TPM PC client measured TPM program principle operation overview.

In accordance with an exemplary embodiment of the invention there is at least a method to enable PCR measurements of late-launched code in a virtualized environment. This will at least allows secure backwards compatible mapping of legacy and trusted software. The embodiments of the invention allow a platform to establish a virtual environment with a secure state for late-launch code to be measured and/or operate without interfering with existing software.

FIG. 1C illustrates another TPM PC client 100 measured TPM program principle operation overview. As illustrated in FIG. 1C there is an isolation boundary established between a TPM mobile API 150 and the TPM PC client 100 which includes a trusted execution environment driver. The TPM PC client 100 includes the trusted computer base TA 170. The TA 170 includes TPM mobile core services 155 as well as iTAP measured/measurement programs 160 and 165. The technology iTAP is a predictive text technology for mobile phones which was designed as a replacement for the old letter mappings on phones to help with word entry. This technology supports mobile phones features such as text messaging and note-taking. The trusted application (TA 102) executes iTAP engine with other onboard credentials (ObC) with an application programming interface (API) (e.g., Microsoft test manager (MTM) API) 170. As shown in FIG. 1C the TPM mobile state 190, which may include a memory cache, processes the iTAPs with the platform API 180 with the virtualized PCR registers 198 to perform the operations in accordance with the exemplary embodiments.

At the time of this invention a binding between this secure environment with the PCR and the trusted application that is being launched is not present. Further, the PCR is singular since in computing devices (e.g., personal computers (PCs)) only one code can be launched at a time. If another code is launched, such as into the same cache area in a PC, a new measurement is performed and any binding for old code is lost. In TPM Mobile, a similar strategy has been devised for launching programs inside the trusted execution environment. However, only one launched application can thereby be measured and bound to TPM Mobile functionality. The current system is inflexible, and does not properly allow for servicing concurrently running trusted applications.

The invention enables an efficient use of the platform configuration registers (PCRs) to provide platform binding for trusted application run under the protective context of a trusted execution environment.

Use cases for measuring code into platform registers includes:

1. Platform binding: A key or data can be bound to the TPM platform, and be released only on condition that the late-launched program is a certain one. This binding amounts to an authorized (secure) storage facility for the code being and launched 2. Remote attestation: A remote platform may want to know which code has been launched and measured into the isolated environment. The fact that the measurement is erased whenever a new late-launch happen can be considered a drawback for the attestation property, since it loses the history regarding earlier measurements.

A typical property-based TCG attestation system may have an arbitrary number of properties to attest, but only a limited number of platform configuration registers (PCR) available. In TCG style attestation software components are measured by the operating system as they are loaded and properties that match the measurements are accumulated into available PCRs. Since there typically are more properties to attest than PCRs available, multiple properties typically need to be accumulated into a single PCR. When a remote verifier requests the attestation of one property, the TPM is forced to attest all the properties accumulated into that PCR. In Mobile TPM, the secure environment is able to accommodate several secure programs that can leverage the measurement and corresponding binding. However, the rigidity of PCRs makes mapping such bindings cumbersome to achieve.

In accordance with a first aspect of the exemplary embodiments of the invention, a single PCR bank register is virtualized, so that its content depends on the entity accessing a Mobile TPM. At least in Mobile TPM, arranging for such a 1-1 mapping between the presented register (contents) and user of the TPM Mobile, for example a calling trusted application, is easy to arrange since both entities are likely run inside the same trusted execution environment. In the environment an operating system or scheduler typically has at least a process context that can be used for mapping or binding, and it only has to last as long as the measured program is running.

In accordance with an exemplary embodiment of the invention a single PCR bank register is in one access form (when accessed e.g. from programs in the operating system) aggregated. Thus, its contents are only extended to and not erased. This provides clear advantages for the process of remote attestation. In addition, the fact that the PCR may only contain a measurement of a single code when accessed from that code itself this makes platform binding of data to the calling program significantly easier.

In accordance with another aspect of the exemplary embodiments of the invention the TPM (mobile) hosts several sets of a single PCR register (or a bank of PCR registers) such that the PCR contents are associated with programs, entities or functions executed in an operating system of a device.

Figure 3:
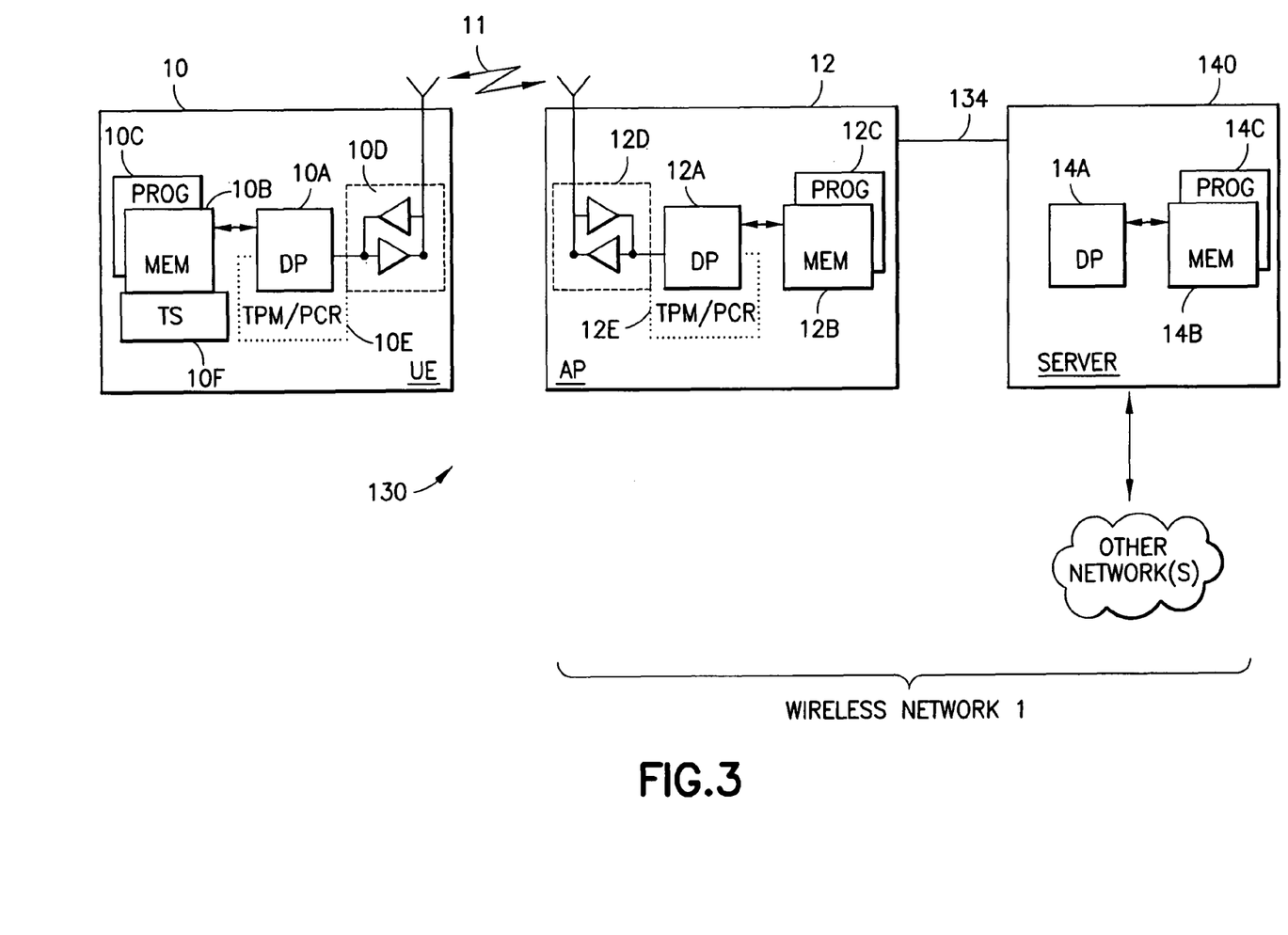
FIG. 3 is a simplified block diagram showing a mobile platform and an access point, where the mobile platform includes a TPM/PCR and trusted software that is operated in accordance with the exemplary embodiments of this invention to perform the operations associated with virtual and/or extended PCRs as in accordance with the exemplary embodiments of the invention.

Before describing in further detail the exemplary embodiments, reference can be made to FIG. 3 for showing an example of a mobile platform (MP) 10 that is in wireless communication via link 11 with an access point (AP) 12 of a wireless network 1. The network 1 may include a network control element (NCE) 14 that may include mobile management entity (MME)/gateway (GW) functionality and which can provide connectivity with a further network, such as a telephone network and/or a data communications network (e.g., the internet). The MP 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the AP 12 via one or more antennas. The AP 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the MP 10 via one or more antennas. The AP 12 is coupled via a data/control path 13 to the NCE 14.

For the purposes of describing the exemplary embodiments of this invention the MP 10 may be assumed to also include a TPM/PCR 10E that can be implemented in HW, SW or as a combination of HW and SW (and firmware). The program 10C can implement an OS, as well as all or some of the functionality of the TPM/PCR 10E. The memory can also store trusted software (TS) 10F. Also included are a set of PCRs 10G that can be realized as memory locations in the memory 10B, or as HW registers, or as a combination of memory locations and HW registers. The TPM/PCR 10E is assumed to operate in accordance with the exemplary embodiments of this invention as described below.

In general, the various embodiments of the MP 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples. All or some of the functionality of the MP 10 and the AP 12 shown in FIG. 3 can be implemented in one or more respective ASICs.

In accordance with the embodiments a device 10 (e.g., which may be implemented as the MP 10 of FIG. 3) is equipped with a TPM and PCR bank (shown together as the TPM/PCR 10E). The TPM/PCR10E includes a measurement for a specific application whenever the TPM mobile is accessed from that specific application. The TPM/PCR 10E has available at least a process context that can be used for mapping or binding. The binding property will work as each application can have data bound to itself. Similarly, the AP 12 or for example an eNB, can be configured to utilize these novel operations in accordance with the aspects of the exemplary embodiments.

The technical implementation of invention is relatively easy to achieve. The TPM mobile is intended to be a SW inside a TEE so the virtualization of a single PCR in a bank is a relatively small addition to the overall code, if the calling interface can provide the "identity" (process Id, UUID) of the caller. This is available is both our own environments, and the GP TEE specification (UUID). Since the virtualization is dynamic, possibly an implementation must restrict the maximum number of trusted application served in this manner, but this is no different from similar (memory) restrictions in trusted environments and secure elements in general.

Figure 2:
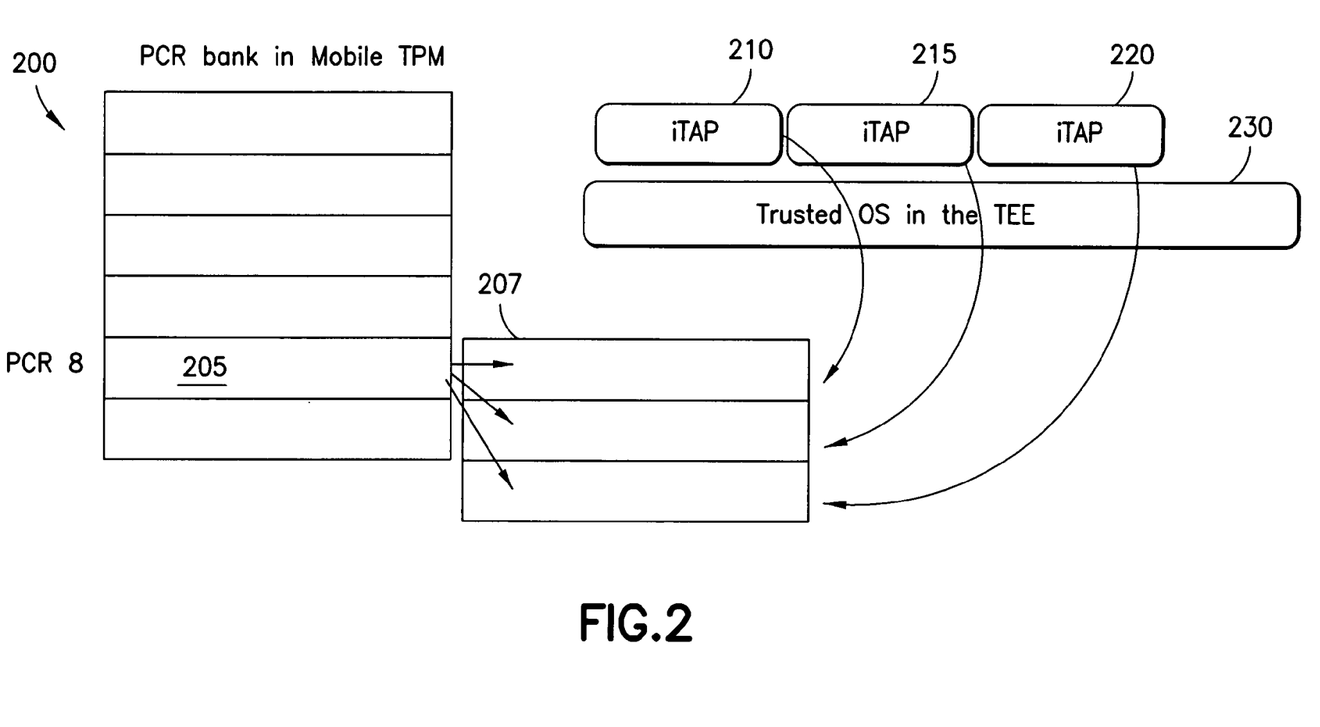
FIG. 2 illustrates TPM Mobile measured TPM program operations in accordance with the exemplary embodiments of the invention.

With regards to FIG. 2, a TPM mobile PCR 8 205 is virtualized such that there is a separate virtualized PCR register entry 207 for each trusted application. As shown by the arrows the virtualized PCR values are associated in an isolated environment 207 by the trusted OS 230 with the PCR 8 205 of the TPM mobile PCR bank 200 where measurements are taken. In accordance with the exemplary embodiments, the virtualized PCR value will contain the measurement with each specific internal trusted application 210, 215, and 220 whenever the TPM mobile is accessed from that specific application. In accordance with the exemplary embodiments the binding property will operate such that each application will have data bound to itself.

In accordance with an exemplary embodiment a key or data is bound to the TPM mobile PCR, and released only on condition that a late-launched program is identified as a certain one. This binding provides authorized and/or (secure) storage facility for the late-launched program being launched using virtualized values for the programs, such as the late-launched programs. Further in accordance with the exemplary embodiments a remote platform can identify code that has been launched and measured into the isolated environment as the history regarding measurements of the virtualized values and binding remains available from the isolated environment.

Describing now the referenced aspects of the exemplary embodiments. General reference with respect to Fundamental Trusted Platform Features can be made to the document TSG Specification Architecture Overview", Specification Revision 1.4, 2 Aug. 2007.

In accordance with the TCG Specification Architecture Overview fundamentals of TPM features include the expectation that a device will behave in a particular manner for a specific purpose. A trusted platform should provide at least three basic features: protected capabilities, integrity measurement and integrity reporting.

Protected capabilities are a set of commands with exclusive permission to access shielded locations. Shielded locations are places (memory, register, etc.) where it is safe to operate on sensitive data; data locations that can be accessed only by protected capabilities. The TPM implements protected capabilities and shielded-locations used to protect and report integrity measurements (called Platform Configuration Registers: PCRs). The TPM also stores cryptographic keys used to authenticate reported measurements. TPM protected capabilities can include additional security functionality such as cryptographic key management, random number generation, sealing data to system state and others as determined necessary by TCG members.

Attestation is the process of vouching for the accuracy of information. External entities can attest to shielded locations, protected capabilities, and Roots of Trust. A platform can attest to its description of platform characteristics that affect the integrity (trustworthiness) of a platform. All forms of attestation require reliable evidence of the attesting entity. Attestation can be understood along several dimensions, attestation by the TPM, attestation to the platform, attestation of the platform and authentication of the platform. Attestation by the TPM is an operation that provides proof of data known to the TPM. This is done by digitally signing specific internal TPM data using an attestation identity key (AIK). The acceptance and validity of both the integrity measurements and the AIK itself are determined by a verifier.

Attestation protocol consists of several steps including:
1. A Challenger requests one or more PCR values from a platform.
2. An agent on the platform containing a TPM collects SML entries.
3. The Platform Agent receives PCR values from the TPM.
4. The TPM signs PCR values using an AIK.
5. The Platform Agent collects credentials that vouch for the TPM. The signed PCR value, SML entries and Credentials are returned to the Challenger.
6. The Challenger verifies the request. The measurement digest is computed and compared with PCR value. The platform credentials are evaluated and signatures checked.

Authentication of the platform provides evidence of a claimed platform identity. The claimed identity may or may not be related to a user or any actions performed by the user. Platform Authentication is performed using any non-migratable signing key. Certified keys (i.e. signed by an AIK) have the added semantic of being attestable. Since there are an unlimited number of non-migratable keys associated with the TPM, there are an unlimited number of identities that can be authenticated.

Integrity measurement is the process of obtaining metrics of platform characteristics that affect the integrity (trustworthiness) of a platform and putting digests of those metrics in PCRs. The starting point of measurement is called the root of trust for measurement. A static root of trust for measurement begins measuring from a well-known starting state such as a power on self-test. A dynamic root of trust for measurement transitions from an un-trusted state to one that is trusted. An optional intermediate step between integrity measurement and integrity reporting is integrity logging, which stores integrity metrics in a log for later use. Logging is recommended. Otherwise integrity measurements might need to be repeated in order to interpret PCR values.

Integrity reporting is the process of attesting to integrity measurements recorded in PCRs. The philosophy of integrity measurement, logging and reporting is that a platform may be permitted to enter any state possible including undesirable or insecure states, but that it may not be permitted to lie about states that it was or was not in. An independent process may evaluate the integrity state(s) and determine an appropriate response.

A measurement kernel generates measurement events. A measurement event consists of two classes of data; 1) measured values—a representation of embedded data or program code and 2) measurement digests—a hash1 of those values. Data are scanned by the measurement kernel which generates a message digest. Digests are a snapshot of the machines operational state. The two data elements (measured values and measurement digest) are stored separately. The measurement digest is stored in the TPM using RTR and RTS functionality. The measured values2 may be stored virtually anywhere at the discretion of the measurement kernel. In fact, it may not be stored at all, but re-computed whenever the serialized representation is needed.

The TPM contains a set of registers, called Platform Configuration Registers (PCR) containing measurement digests. Algebraically, updates to a PCR follows as: PCR[n] β SHA-1 (PCR[n]+measured data). PCR values are temporal and are reset at system reboot. Verification of measurement events requires recreation of the measurement digest and a simple compare of digest values (using the PCR value as one of the comparators). TCG does not define data encoding rules for SML contents but recommends following appropriate standards such as Extensible Markup Language (XML) to ensure broad accessibility.

In accordance with the exemplary embodiments of the invention there is implementing a PCR in a TPM, as in TCG Specification Architecture Overview, in a way that the value of the register depends on the entity calling the TPM. In accordance with the exemplary embodiments of the invention, attestation PCR8 is as defined above if requested through the respective trusted application. Further, if the PCR8 is being used, for example from the OS or from a trusted application that has not been late-launched the "non-virtualized" PCR8 value will contain the aggregated late-launched measurements of all trusted programs that have been measured. These aggregated late-launched measurements of all the trusted programs are placed in order of measurement and aggregated as a PCR. The PCR would indicate for example, new value=H (old value, H (measurement)).

In accordance with the exemplary embodiments of the invention, for attestation, a more complex aggregation can be used, to include all measurements in an attestation snapshot. As an example, and as is described above, a TPM mobile may have a single PCR register dedicated to receive measurements of trusted applications, as measured by the trusted OS inside the TEE. Say that this is PCR 15. Each caller=trusted application, will, when accessing the TPM Mobile, see the measurement of itself as the value in that register. However, for device attestation, the totality of these PCR values over all trusted applications that have accessed the TPM mobile may be needed, to e.g. prove which trusted applications have been accessing the TPM mobile (or in some implementations even which trusted applications that have been launched overall). For this, one approach is to aggregate all the "virtualized" PCR 15 values in a single PCR15 value presented to any caller that is not a trusted application but e.g. an application calling from the "normal", rich environment OS. The aggregated "late-launched" (PCR15) measurements of all the trusted programs are placed in order of measurement and aggregated as a single PCR 15. The PCR 15 aggregation would for example be constructed as successive invocations of: new value=H (old value, H (measurement)).

In legacy TPM standards, the PCR bank is static, dedicated to a given TPM element, and the PCR are initialized to 00000 . . . 00 (or 0) at device boot. When the PCRs are virtualized per caller, more memory management will be needed inside the TPM Mobile to manage that the right PCR register is presented to each individual caller. In addition the identity (UUID) of the caller must be stored with the virtualized PCR. Since the TPM Mobile in many implementations is another application running under the same trusted OS inside TEE as the callers that will be allocated their respective PCRs, such a data structure is easy to accomplish. One simple example is to allow for a predefined maximum of callers (say 16 or 256), and associated with the main PCR bank a table with say 16 rows and two columns could be initialized at boot along with the rest of the PCRs. Whenever the trusted OS would measure a new application to be launched under it, it can provide to the TPM mobile application the UUID and the measurement for insertion in this table. Whenever a trusted application accesses the TPM Mobile (using a remote procedure call within the trusted OS, between the two applications, the caller application and the TPM Mobile), its UUID would be known to the TPM Mobile and the TPM Mobile could present the value in the appropriate row in the table above as the value in PCR 15.

The exemplary embodiments of the invention provide at least the advantages that:

The late-launch system becomes more versatile. This is most pressing in MobileTPM, but may eventually become an issue in multicore implementations in PCs as well.

Platform binding can be done for all trusted applications, independently of parallelism in their execution.

Remote attestation actually improves. A likely setup is that all trusted applications are measured, and then the aggregated PCR8 would contain the complete history of all late-launched trusted code, which in turn provides a statement about what code has been executed in the trusted OS since boot. This information has value for e.g. determining whether "broken" programs have been run in the trusted OS, possibly having been able to harm the integrity or other properties of the TEE.

Figure 4:
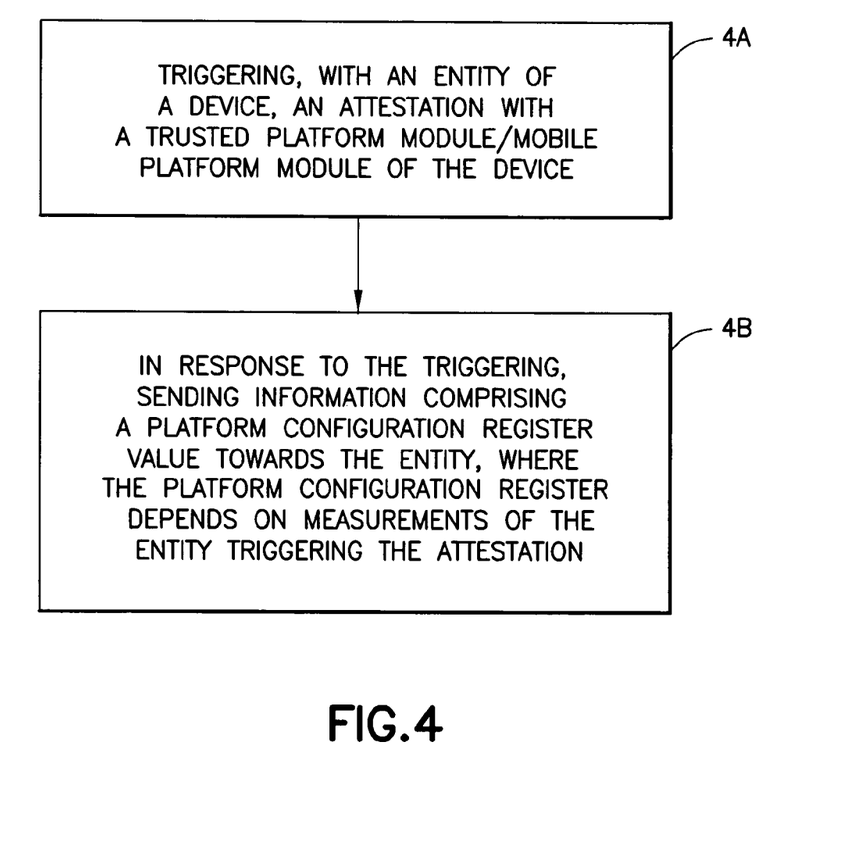
FIG. 4 is a logic flow diagram that illustrates the operation of a method, and a result of execution of computer program instructions, in accordance with the exemplary embodiments of this invention.

FIG. 4 is a logic flow diagram that illustrates the operation of a method, and a result of execution of computer program instructions, in accordance with the exemplary embodiments of this invention. In accordance with these exemplary embodiments a method performs in a mobile device, at Block 4A a step of triggering, with an entity of a device, an attestation with a trusted platform module/mobile platform module of the device. At Block 413 there is performed a step, in response to the triggering, of sending information comprising a platform configuration register value towards the entity, where the platform configuration register depends on measurements of the entity triggering the attestation.

The method as in FIG. 4, further comprising binding the entity to the trusted platform module of the mobile device.

The method as in FIG. 4, where the entity comprises a trusted application running on the mobile device.

The method as in FIG. 4 and the paragraph above, where the information comprises measurement information associated with the software program.

The method as in FIG. 4 and the paragraph above, where the information comprises measurement information associated with the software program.

The method as in FIG. 4, where the PCR is a virtual PCR associated with the entity.

The exemplary embodiments of this invention also provide an apparatus that comprises a processor and a memory including computer program code, where the memory and computer program code are configured to, with the processor, cause the apparatus at least to perform triggering, with an entity of a device, an attestation with a trusted platform module/mobile platform module of the device. And, in response to the triggering, to perform sending information comprising a platform configuration registers value towards the entity, where the platform configuration register depends on measurements of the entity triggering the attestation.

The exemplary embodiments of this invention also provide an apparatus that comprises means for receiving a request for access at trusted software of a mobile device from an entity of the mobile device; means for triggering an attestation with a trusted platform module/mobile platform module of the device. And, means in response to the triggering, for sending information comprising a platform configuration register value towards the entity, where the platform configuration register depends on measurements of the entity triggering the attestation In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters are not intended to be limiting in any respect, as these parameters may be identified by any suitable names. Further, the formulas and expressions that use these various parameters may differ from those expressly disclosed herein. Further, the various names assigned to different events (e.g., challenge, etc.) are not intended to be limiting in any respect, as these various events may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   triggering, with a trusted application of a mobile device from a number of trusted applications, an attestation of the trusted application with a trusted platform module of the mobile device, wherein the number of trusted applications permitted to trigger attestation is restricted to a predefined maximum number;
   in response to the triggering, defining, by the mobile device, information comprising a value of a dynamic virtualized platform configuration register, where the platform configuration register comprises an aggregate of late-launched measurements from the trusted application and at least one other trusted application, where the aggregate of the measurements from the trusted application and the at least one other trusted application is in a successive order of measurement in the platform configuration register, and where the value of the platform configuration register depends on measurements in the aggregate of measurements of the trusted application triggering the attestation; and
   using the information comprising the value of the dynamic virtualized platform configuration register to perform the attestation and execute the trusted application.

2. The method of claim 1, further comprising binding the trusted application to the trusted platform module of the mobile device based on at least the value.

3. The method of claim 1, where the information comprises measurement information associated with the trusted application.

4. The method of claim 1, where the aggregate of late-launched measurements from the trusted application and at least one other trusted application comprises separate entries in the virtualized platform configuration register separating late-launched measurements from the trusted application from late-launched measurements from the at least one other trusted application, where the separate entries are separated by at least one comma in the virtualized platform configuration register.

5. The method of claim 1, where the virtualized platform configuration register is associated with the trusted application.

6. The method of claim 1, where the aggregate of late-launched measurements from the trusted application and the at least one other trusted application is bound, respectively, to the trusted application and the at least one other trusted application in the platform configuration register.

7. The method of claim 6, where the value of the platform configuration register depends on a late-launched measurement from the aggregate of late-launched measurements of the virtualized platform configuration register that is bound to the trusted application triggering the attestation.

8. The method of claim 1, where the value of the platform configuration register is defined based on an identification associated with the trusted application triggering the attestation.

9. A non-transitory computer readable medium encoded with computer program instructions executable by a processor to perform actions comprising:
   triggering, with a trusted application of a mobile device from a number of trusted applications, an attestation of the trusted application with a trusted platform module of the mobile device, wherein the number of trusted applications permitted to trigger attestation is restricted to a predefined maximum number;
   in response to the triggering, defining, by the mobile device, information comprising a value of a dynamic virtualized platform configuration register, where the platform configuration register comprises an aggregate of late-launched measurements from the trusted application and at least one other trusted application, where the aggregate of the measurements from the trusted application and the at least one other trusted application is in a successive order of measurement in the platform configuration register, and where the value of the platform configuration register depends on measurements in the aggregate of measurements of the trusted application triggering the attestation; and
   using the information comprising the value of the dynamic virtualized platform configuration register to perform the attestation and execute the trusted application.

10. The non-transitory computer readable medium of claim 9, further comprising binding the trusted application to the trusted platform module of the mobile device based on at least the value.

11. The non-transitory computer readable medium of claim 9, where the information comprises measurement information associated with the trusted application.

12. The non-transitory computer readable medium of claim 9, where the aggregate of late-launched measurements from the trusted application and at least one other trusted application comprises separate entries in the virtualized platform configuration register separating late-launched measurements from the trusted application from late-launched measurements from the at least one other trusted application, where the separate entries are separated by at least one comma in the virtualized platform configuration register.

13. The non-transitory computer readable medium of claim 9, where the virtualized platform configuration register is associated with the trusted application.

14. An apparatus comprising:
at least one processor; and
at least one memory including computer program code, where the at least one memory and the computer program code are configured, with the at least one processor, to cause the apparatus to at least:
trigger, with a trusted application of a mobile device from a number of trusted applications, an attestation of the trusted application with a trusted platform module of the mobile device, wherein the number of trusted applications permitted to trigger attestation is restricted to a predefined maximum number;
in response to the triggering, define, by the mobile device, information comprising a value of a dynamic virtualized platform configuration register, where the platform configuration register comprises an aggregate of late-launched measurements from the trusted application and at least one other trusted application, where the aggregate of the measurements from the trusted application and the at least one other trusted application is in a successive order of measurement in the platform configuration register, and where the value of the platform configuration register depends on measurements in the aggregate of measurements of the trusted application triggering the attestation; and
use the information comprising the value of the dynamic virtualized platform configuration register to perform the attestation and execute the trusted application.

15. The apparatus of claim 14, further comprising binding the trusted application to the trusted platform module of the mobile device based on at least the value.

16. The apparatus of claim 14, where the information comprises measurement information associated with the trusted application.

17. The apparatus of claim 14, where the aggregate of the late-launched measurements from the trusted application and at least one other trusted application comprises separate entries in the virtualized platform configuration register separating late-launched measurements from the trusted application from late-launched measurements from the at least one other trusted application, where the separate entries are separated by at least one comma in the virtualized platform configuration register.

18. The apparatus of claim 14, where the virtualized platform configuration register is associated with the trusted application.

* * * * *